Figure 1:
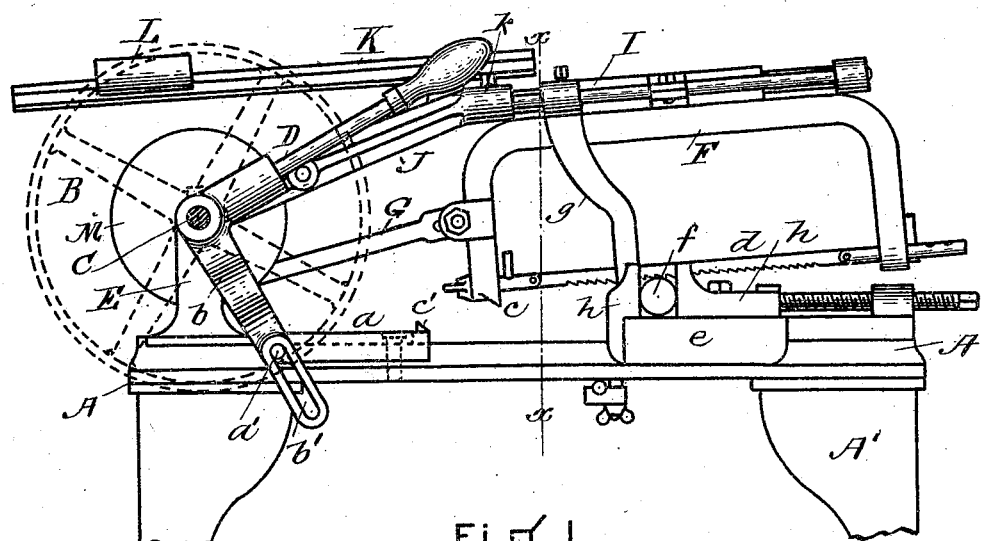

(No Model.)

H. L. PRATT.
HACK SAW MACHINE.

No. 502,996. Patented Aug. 8, 1893.

WITNESSES.
Frank G. Parker.
Jno: Hy. Kerrison.

INVENTOR
Henry L. Pratt
by Bowdoin S. Parker
his atty.

UNITED STATES PATENT OFFICE.

HENRY L. PRATT, OF BROOKLYN, NEW YORK, ASSIGNOR TO THE MILLER'S FALLS COMPANY, OF MILLER'S FALLS, MASSACHUSETTS.

HACK-SAW MACHINE.

SPECIFICATION forming part of Letters Patent No. 502,996, dated August 8, 1893.

Application filed November 3, 1892. Serial No. 450,849. (No model.)

*To all whom it may concern:*

Be it known that I, HENRY L. PRATT, of Brooklyn, in the county of Kings and State of New York, have invented a certain new and useful Improvement in Hack-Saw Machines, of which the following, taken in connection with the accompanying drawings, is a specification.

My present invention relates to certain improvements in the hack saw machines now commonly in use.

In the drawings like letters of reference indicate corresponding parts.

Figure 3:
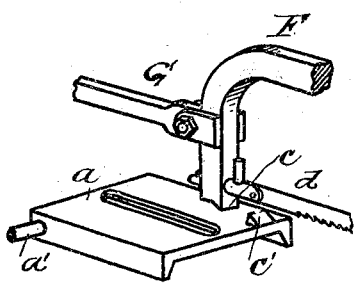
Figure 2:
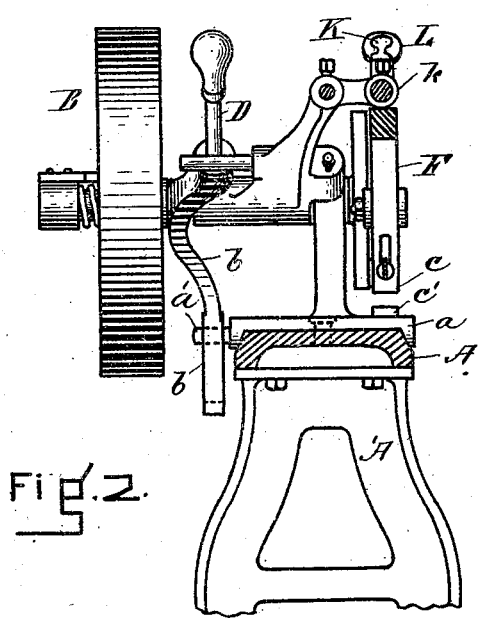

In Figure 1, is shown a side elevation of a hack saw machine with my improvements. Fig. 2, is a sectional view of a machine on line $x, x$ of Fig. 1. Fig. 3, is a perspective of a portion of one of the devices detached from the machine.

The particular devices constituting my present invention refer more especially to automatically stopping the operation of the machine and also to a new method of supporting and regulating the saw frame guides and in adjusting the weight or pressure upon the saw blade when at work, together with other incidental improvements to be hereinafter explained.

In the drawings A. is the bed of the machine, supported by legs A'.

B. is the driving pulley which is journaled loosely on shaft C. the shaft being supported by standard E. upon bed A. of the machine.

J. is the arm which supports the guides I. upon which and supported by is the saw frame F. in which frame is held the saw $d$. The arm J. is journaled on the shaft or arbor C. and by this means the saw frame and its saw are raised and lowered as desired.

G. is the rod or pitman attached to pulley M. on shaft C. the opposite end being secured to frame F. and to which it communicates a reciprocating motion, the saw frame, meanwhile, being supported by the guides I, attached to arm J.

D. is a lever connecting at its lower end with the cam device used for stopping the machine.

$g$. is an arm secured to one of the guide rods and having at its lower end a guide through which the saw blade passes; the work or bar of metal to be sawed off, $f$. is held in place by the jaws $h.$ $h.$ attached to part $e.$ which rests on bed A. of the machine.

In Fig. 3, the saw frame is represented as broken off, also the saw blade, $d$. and arm or pitman, G.

Now by referring to the patent granted Herbert D. Lanfair, dated January 12, 1892, and numbered 466,929, a full description of the hack saw machine in general use will be found and in connection with which my devices hereinafter described are applicable. My present devices are in fact improvements upon the Lanfair machine hereinbefore referred to.

In practice it is found that it is desirable to automatically stop the saw, when the bar of metal being cut off is severed, and for this purpose I provide a slide or carriage $a$. which moves back and forth on the body of frame A. At one end of this sliding carriage I form a beveled projection, $i.$ $e.$ beveled on the outer side or end and perpendicular on the inner side as shown in Fig. 1. $c'$. On the lower and inner end of saw frame F. I form a corresponding projection $c$. the bevel part being upon the opposite side from that shown in $c'$. Upon the carriage is also placed a pin $a'$. which is arranged to move in a slot $b'$. formed in arm $b$., the said arm being attached to the hand lever D.

The operation of this device is as follows: The machine being in operation, the saw and its frame gradually fall as the metal $f$. is cut off. When the saw blade $d$. finishes the cut, the frame F. being drawn back in its reciprocation the projection $c$. slides up the beveled projection $c'$, on slide or carriage and the two projections $c$ and $c'$. interlock, and as the frame is again forced forward it carries with it the carriage $a$. The forward movement of $a$. pulls forward the end of arm $b$. and this forces the hand lever D. upward, and the cam device is thrown out of working contact with the parts actuated by pulley B. and the machine always stops at the end of the outward stroke, thus incidentally, preventing the saw from being drawn back after the cutting is finished: it also enables new work to commence with a full cutting stroke by the saw; it is automatic and can easily be set to stop the saw at any point in the cut desired by any simple device that will readily suggest itself to any mechanic, as for instance by making the projection $c'$. adjustable upon the carriage by means of a slot and set screw and nut or by equivalent means. The connection between the saw frame and carriage and also between the carriage and the arm $b$. and the arm and hand lever D. may be varied without departing from the spirit of my invention.

The second part of my present invention consists of the device composed of the lever K. attached to the arm J. by a connection indicated by $k$. Upon the lever K. is placed the sliding weight L. Heretofore the arm J; and the ways or guide rods I. supporting the saw frame F. have been held and adjusted by a spring and screw rod attached to a projection formed upon the outer end of arm but this only served to sustain the weight of the lever and its dependencies and the only weight that could be placed upon the saw blade was the dead weight of the arm, ways, frame, &c.

It will be observed that the lever K. extends backward beyond the arbor C. upon which the arm J. is journaled, thus bringing the weight L. beyond the center of gravity and thereby supporting the arm D., guides I. and saw frame F. By sliding the weight L. forward upon the lever K. any desired pressure can be given the saw blade. It can be adjusted from the most delicate to the full power of the weight. In soft metals the rapidity of the cut of the saw is very desirable aside from doing much more work in a given time.

The simplicity of construction cheapens the cost of manufacture and this and the ease of adjustment are elements of considerable value. As springs are apt to lose their power and elasticity the advantages of a simple, positive action must be apparent. The sliding weight arranged and combined as shown and described answers most perfectly the balancing and the weighting, in connection with the practical operation of the machine.

Having now fully described my invention, what I claim, and desire to secure by Letters Patent of the United States, is—

1. In a hack saw machine, a bed A; a carriage, adapted to move on said bed and having a projection $c'$., an arm suitably connected with said carriage, and adapted to move a cam lever, a power wheel and power shaft, a suitable clutch for locking the wheel and shaft together, a cam lever, adapted to operate said clutch, and a saw frame with a suitable projection or part adapted to catch or interlock with projection $c'$. on carriage, and all combined substantially as and for the purposes set forth.

2. In a hack saw machine, the device herein described for automatically stopping the saw at the end of the forward stroke and consisting of the sliding carriage $a$. suitably arranged to be automatically engaged and moved by the saw frame, and the lever $b$. suitably connected with said carriage and adapted to be actuated by it, and said lever $b$. also suitably connected with and arranged to operate and disengage the cam mechanism from the driving pulley, all substantially as herein set forth.

3. In a hack saw machine, a power shaft, an arm pivoted or fulcrumed on said shaft and having a sliding connection with the saw, a lever secured to said arm and an adjustable weight adapted to move on said lever to the front and rear of the fulcrum of the arm, and all combined and adapted to operate, substantially as and for the purposes set forth.

In testimony whereof I have signed my name to this specification, in the presence of two subscribing witnesses, on this 29th day of October, A. D. 1892.

HENRY L. PRATT.

Witnesses:
   THOS. G. MOORE,
   EDWIN H. PRATT.